United States Patent
Lee et al.

(10) Patent No.: US 10,176,883 B2
(45) Date of Patent: Jan. 8, 2019

(54) POWER-UP SEQUENCE PROTECTION CIRCUIT FOR AVOIDING UNEXPECTED POWER-UP VOLTAGE

(71) Applicant: eMemory Technology Inc., Hsin-Chu (TW)

(72) Inventors: Chieh-Tse Lee, Hsinchu (TW); Chih-Chun Chen, Taipei (TW); Cheng-Da Huang, Hsinchu County (TW); Chun-Hung Lin, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 15/402,242

(22) Filed: Jan. 10, 2017

(65) Prior Publication Data

US 2017/0207773 A1    Jul. 20, 2017

Related U.S. Application Data

(60) Provisional application No. 62/280,137, filed on Jan. 19, 2016.

(51) Int. Cl.
*G06F 3/06* (2006.01)
*G11C 5/06* (2006.01)
(Continued)

(52) U.S. Cl.
CPC ............ *G11C 17/18* (2013.01); *G06F 3/064* (2013.01); *G06F 3/0619* (2013.01);
(Continued)

(58) Field of Classification Search
CPC ............ G11C 17/18; G11C 7/22; G11C 7/222; G11C 7/225; G11C 7/227; G11C 16/08; G11C 16/10; G11C 16/102; G11C 16/105; G11C 16/107; G11C 16/22; G11C 16/24; G11C 16/26; G11C 16/28; G11C 16/32; G11C 16/048; G11C 7/10; G11C 7/24; H03K 3/356113; H03K 3/356121; H03K 3/35613; H03K 3/356139; G06F 3/064; G06F 11/1076; G06F 11/108;
(Continued)

(56) References Cited

U.S. PATENT DOCUMENTS 6,781,413 B2 *  8/2004  Kihara .............. H03K 3/356008
                                                       326/63
8,063,662 B2 * 11/2011  Foley ............... H03K 3/356165
                                                       326/63

(Continued)

*Primary Examiner* — Patrick C Chen
(74) *Attorney, Agent, or Firm* — Winston Hsu (57) ABSTRACT

A power-up sequence protection circuit includes a first transistor, a second transistor, a third transistor, and a fourth transistor. First terminals of the first transistor, the second transistor, and the fourth transistor are coupled for receiving a program voltage. A control terminal of the third transistor is used for receiving a device voltage. A second terminal of the fourth transistor is used for outputting the program voltage when the fourth transistor is turned on. When the program voltage is unexpectedly powered up while the device voltage is not powered up, the first transistor is turned on, the second transistor is turned off, and the fourth transistor is turned off so as to block the program voltage outputted from the second terminal of the fourth transistor.

15 Claims, 5 Drawing Sheets

(51) Int. Cl.
| | |
|---|---|
| *G11C 17/18* | (2006.01) |
| *G11C 17/16* | (2006.01) |
| *H04L 9/32* | (2006.01) |
| *G11C 29/00* | (2006.01) |
| *G11C 16/22* | (2006.01) |
| *G11C 7/24* | (2006.01) |
| *G06F 21/73* | (2013.01) |
| *G11C 16/04* | (2006.01) |
| *G11C 16/08* | (2006.01) |
| *G11C 16/24* | (2006.01) |
| *G11C 16/26* | (2006.01) |
| *G11C 16/32* | (2006.01) |
| *G06F 11/10* | (2006.01) |
| *G06F 21/72* | (2013.01) |
| *H03K 3/356* | (2006.01) |
| *G11C 7/10* | (2006.01) |
| *G11C 7/22* | (2006.01) |
| *G06F 12/14* | (2006.01) |
| *H01L 27/112* | (2006.01) |

(52) U.S. Cl.
CPC ........ *G06F 3/0673* (2013.01); *G06F 11/1076* (2013.01); *G06F 12/1408* (2013.01); *G06F 21/72* (2013.01); *G06F 21/73* (2013.01); *G11C 7/10* (2013.01); *G11C 7/22* (2013.01); *G11C 7/24* (2013.01); *G11C 16/0408* (2013.01); *G11C 16/08* (2013.01); *G11C 16/22* (2013.01); *G11C 16/24* (2013.01); *G11C 16/26* (2013.01); *G11C 16/32* (2013.01); *G11C 17/16* (2013.01); *G11C 29/785* (2013.01); *H03K 3/356113* (2013.01); *H04L 9/3278* (2013.01); *G06F 2212/1052* (2013.01); *G06F 2212/402* (2013.01); *G11C 5/063* (2013.01); *H01L 27/11206* (2013.01)

(58) Field of Classification Search
CPC ............. G06F 11/1084; G06F 11/1088; G06F 11/1092; G06F 11/1096
USPC .......................................................... 327/333
See application file for complete search history.

(56) References Cited

U.S. PATENT DOCUMENTS

| | | |
|---|---|---|
| 2003/0098712 A1 | 5/2003 | Kihara |
| 2008/0316660 A1 | 12/2008 | Huang |
| 2009/0027972 A1* | 1/2009 | Bode ........................ G11C 8/08 |
| | | 365/185.23 |
| 2015/0214938 A1* | 7/2015 | Fujii ........................ H03K 5/13 |
| | | 327/288 |

* cited by examiner

POWER-UP SEQUENCE PROTECTION CIRCUIT FOR AVOIDING UNEXPECTED POWER-UP VOLTAGE

CROSS REFERENCE TO RELATED APPLICATIONS

This application claims the benefit of U.S. provisional application No. 62/280,137, filed Jan. 19, 2016.

BACKGROUND OF THE INVENTION

1. Field of the Invention

The present invention illustrates a power-up sequence protection circuit, and more particularly, a power-up sequence protection circuit for avoiding an unexpected power-up voltage.

2. Description of the Prior Art

Non-volatile memory is a type of memory that retains information it stores data even when no power is supplied to memory blocks. Some examples include magnetic devices, optical discs, flash memory, and other semiconductor-based memory topologies. Non-volatile memory can be categorized in electrically addressed systems (i.e., read-only memory) and mechanically addressed systems (i.e., hard disks, optical disc, magnetic tape, holographic memory, and such). Specifically, since non-volatile memory does not require its memory data to be periodically refreshed, it is commonly used for secondary storage or long-term consistent storage.

To drive an internal circuit of the non-volatile memory, various voltages are required for controlling or enabling the non-volatile memory sequentially. For example, a device voltage is inputted to the internal circuit for controlling a core circuit of the internal circuit. An input/output (I/O) voltage is inputted to the internal circuit for controlling input/output devices of the internal circuit. A program voltage is inputted to the internal circuit for controlling an access operation of the internal circuit. These voltages can be appropriately adjusted for driving the internal circuit of the non-volatile memory. Specifically, in the internal circuit, the device voltage (i.e., control circuit power) has to be powered up first.

In the internal circuit of the non-volatile memory, when an unexpected voltage is powered up (i.e., such as an unexpected program voltage is powered up) before the device voltage is powered up, the internal circuit is operated under an abnormal state, leading to power leakage and circuit disturbance of some components.

SUMMARY OF THE INVENTION

In an embodiment of the present invention, a power-up sequence protection circuit is disclosed. The power-up sequence protection circuit comprises a first transistor, a second transistor, a third transistor, and a fourth transistor. The first transistor comprises a first terminal for receiving a program voltage, a control terminal, and a second terminal. The second transistor comprises a first terminal coupled to the first terminal of the first transistor, a control terminal coupled to the second terminal of the first transistor, and a second terminal coupled to the control terminal of the first transistor. The third transistor comprises a first terminal coupled to the second terminal of the first transistor, a control terminal for receiving a device voltage, and a second terminal for receiving a ground voltage. The fourth transistor comprises a first terminal coupled to the first terminal of the second transistor, a control terminal coupled to the second terminal of the first transistor, and a second terminal for outputting the program voltage when the fourth transistor is turned on.

In another embodiment of the present invention, a power-up sequence protection circuit is disclosed. The power-up sequence protection circuit comprises a first transistor, a capacitor, a second transistor, a third transistor, a fourth transistor, a fifth transistor, and a sixth transistor. The first transistor comprises a first terminal for receiving a program voltage, a control terminal, and a second terminal. The capacitor comprises a first terminal coupled to the first terminal of the first transistor, and a second terminal coupled to the second terminal of the first transistor. The second transistor comprises a first terminal coupled to the first terminal of the first transistor, a control terminal coupled to the second terminal of the first transistor, and a second terminal coupled to the control terminal of the first transistor. The third transistor comprises a first terminal coupled to the second terminal of the first transistor, a control terminal for receiving a device voltage, and a second terminal for receiving a ground voltage. The fourth transistor comprises a first terminal coupled to the first terminal of the first transistor, a control terminal coupled to the second terminal of the second transistor, and a second terminal. The fifth transistor comprises a first terminal coupled to the second terminal of the fourth transistor, a control terminal coupled to the control terminal of the third transistor, and a second terminal for receiving the ground voltage. The sixth transistor comprises a first terminal coupled to the first terminal of the first transistor, a control terminal coupled to the first terminal of the fifth transistor, and a second terminal for outputting the program voltage when the sixth transistor is turned on.

In another embodiment of the present invention, a power-up sequence system is disclosed. The power-up sequence system comprises at least one power-up sequence protection circuit and an internal circuit. The at least one power-up sequence protection circuit is used for receiving at least one driving voltage and outputting at least one output voltage accordingly. The internal circuit is coupled to the at least one power-up sequence protection circuit for receiving a device voltage and the at least one output voltage. When a driving voltage is unexpectedly power-up while the device voltage is not ready, a corresponding power-up sequence protection circuit performs a circuit protection function to avoid outputting the driving voltage to the internal circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
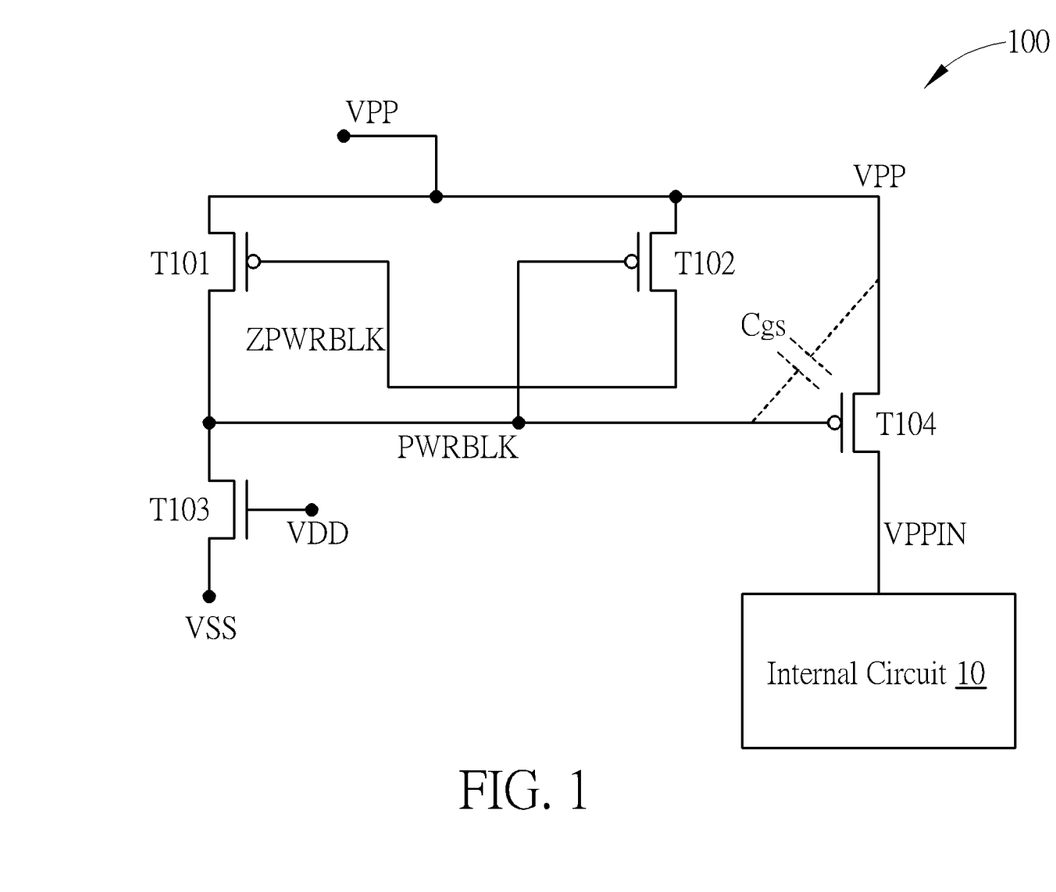
FIG. 1 illustrates a structure of a power-up sequence protection circuit according to a first embodiment of the present invention.

FIG. 1 illustrates a structure of a power-up sequence protection circuit 100 according to a first embodiment of the present invention. The power-up sequence protection circuit 100 includes a first transistor T101, a second transistor T102, a third transistor T103, and a fourth transistor T104. The first transistor T101 includes a first terminal for receiving a program voltage VPP, a control terminal, and a second terminal. The second transistor T102 includes a first terminal coupled to the first terminal of the first transistor T101, a control terminal coupled to the second terminal of the first transistor T101, and a second terminal coupled to the control terminal of the first transistor T101. The third transistor T103 includes a first terminal coupled to the second terminal of the first transistor T101, a control terminal for receiving a device voltage VDD, and a second terminal for receiving a ground voltage VSS. The fourth transistor T104 includes a first terminal coupled to the first terminal of the second transistor T102, a control terminal coupled to the second terminal of the first transistor T101, and a second terminal for outputting the program voltage VPP when the fourth transistor is turned on. A voltage of the control terminal of the fourth transistor T104 is denoted as PWRBLK (hereafter, say "voltage PWRBLK"). A voltage of the control terminal of the first transistor T101 is denoted as ZPWRBLK (hereafter say "voltage ZPWRBLK"). To avoid ambiguity, a voltage of the second terminal of the fourth transistor T104 is denoted as VPPIN (hereafter, say voltage VPPIN). In other words, when the fourth transistor T104 is turned on, the voltage VPPIN is equal to the program voltage VPP. When the fourth transistor T104 is turned off, the voltage VPPIN may be a low voltage or under a floating state. Also, the second terminal of the fourth transistor T104 is coupled to an internal circuit 10. Thus, the internal circuit 10 can receive the voltage VPPIN from the second terminal of the fourth transistor T104. Specifically, in the power-up sequence protection circuit 100, the first transistor T101, the second transistor T102, and the fourth transistor T104 can be P-type metal-oxide-semiconductors. The third transistor T103 can be an N-type metal-oxide-semiconductor. In another embodiment, the metal-oxide-semiconductors can be input/output devices (I/O devices). Further, thicknesses of gate oxide layers of the I/O devices are greater than gate oxide layers of the core metal-oxide-semiconductors. The power-up sequence protection circuit 100 can perform a circuit protection when the program voltage VPP is unexpectedly powered up while the device voltage VDD is not powered up. The power-up sequence protection circuit 100 can be regarded as a bypass circuit when the device voltage VDD is powered up. Operations of the power-up sequence protection circuit 100 are illustrated below.

In an initial stage, the device voltage VDD is at a low voltage (i.e., a floating state or substantially equal to the ground voltage VSS). Thus, the third transistor T103 is turned off. The voltage ZPWRBLK and the voltage PWRBLK are initially at a low voltage. When the program voltage VPP is unexpectedly powered up while the device voltage VDD is not powered up (i.e., an abnormal condition), the voltage ZPWRBLK and the voltage PWRBLK are increased gradually through the first transistor T101 and the second transistor T102. Specifically, a parasitic capacitor Cgs is generated between the first terminal and the control terminal of the fourth transistor T104. Since the parasitic capacitor Cgs can be charged and thus regarded as a coupling conductive component, the voltage PWRBLK increases faster than the voltage ZPWRBLK. In the power-up sequence protection circuit 100, when the voltage PWRBLK is increased to satisfy VPP−PWRBLK<|Vthp|, the second transistor T102 is turned off. The voltage Vthp is denoted as a threshold voltage of the second transistor T102. Then the voltage ZPWRBLK is fixed at a steady voltage lower than the voltage PWRBLK, which keeps the first transistor T101 turned on. For example, when the voltage PWRBLK is increased to the program voltage VPP (for example, 7.5 volts), the voltage ZPWRBLK is then fixed to the steady voltage substantially equal to half of the program voltage (for example, 3.42~3.75 volts). Since the voltage PWRBLK can be increased to equal to the program voltage VPP, the fourth transistor T104 is turned off. As a result, the program voltage VPP can be blocked from entering to the second terminal of the fourth transistor T104 from the first terminal of the fourth transistor T104. Therefore, the second terminal of the fourth transistor T104 can avoid outputting the unexpected power-up program voltage VPP. Thus, for an internal circuit coupled to the power-up sequence protection circuit 100, a risk of circuit disturbance or power leakage can be reduced. Briefly, when the program voltage VPP is unexpectedly powered up while the device voltage VDD is not powered up, the first transistor T101 is turned on, the second transistor T102 is turned off and the fourth transistor T104 is turned off so as to avoid outputting the program voltage VPP to the internal circuit 10.

When the device voltage VDD is powered up while the program voltage VPP is not powered up (i.e., a normal condition), the third transistor T103 is turned on. Then, the voltage PWRBLK is decreased to substantially equal to the ground voltage VSS, which turns on the second transistor T102. This allows the program voltage VPP to pass through the second transistor T102. Since the program voltage VPP is not powered up (i.e., a floating state or substantially equal to the ground voltage VSS), the first transistor T101 is turned on, and the low voltage program voltage VPP can pass through the first transistor T101. Since the voltage PWRBLK is already at the low voltage, the turning on of the first transistor T101 would not change the voltage of the voltage PWRBLK. The fourth transistor T104 will remain turned on. And the program voltage VPP can pass through the fourth transistor T104. Therefore, when the device voltage VDD is powered up while the program voltage VPP is not powered up, the power-up sequence protection circuit 100 can be regarded as a bypass circuit since the program voltage VPP is directly outputted to the internal circuit 10 through the fourth transistor T104.

When the device voltage VDD is powered up while the program voltage VPP is already powered up, the third transistor T103 is turned on. Then the voltage PWRBLK is decreased to substantially equal to the ground voltage VSS, which turns on the second transistor T102. Since the program voltage VPP is already powered up when the device voltage VDD is powered up, the voltage ZPWRBLK is increased to substantially equal to the program voltage VPP since the second transistor T102 is turned on. Thus the first transistor T101 is turned off, and the voltage PWRBLK is fixed to the ground voltage VSS. Since the voltage PWRBLK is substantially at the ground voltage VSS, the fourth transistor T104 is turned on. As a result, the voltage VPPIN at the second terminal of the fourth transistor T104 is equal to the program voltage VPP (for example, 7.5 volts). In other words, when the device voltage VDD is powered up even while the program voltage VPP is already powered up, the power-up sequence protection circuit 100 can be regarded as a bypass circuit since the program voltage VPP is directly outputted to the internal circuit 10 through the fourth transistor T104.

Figure 2:
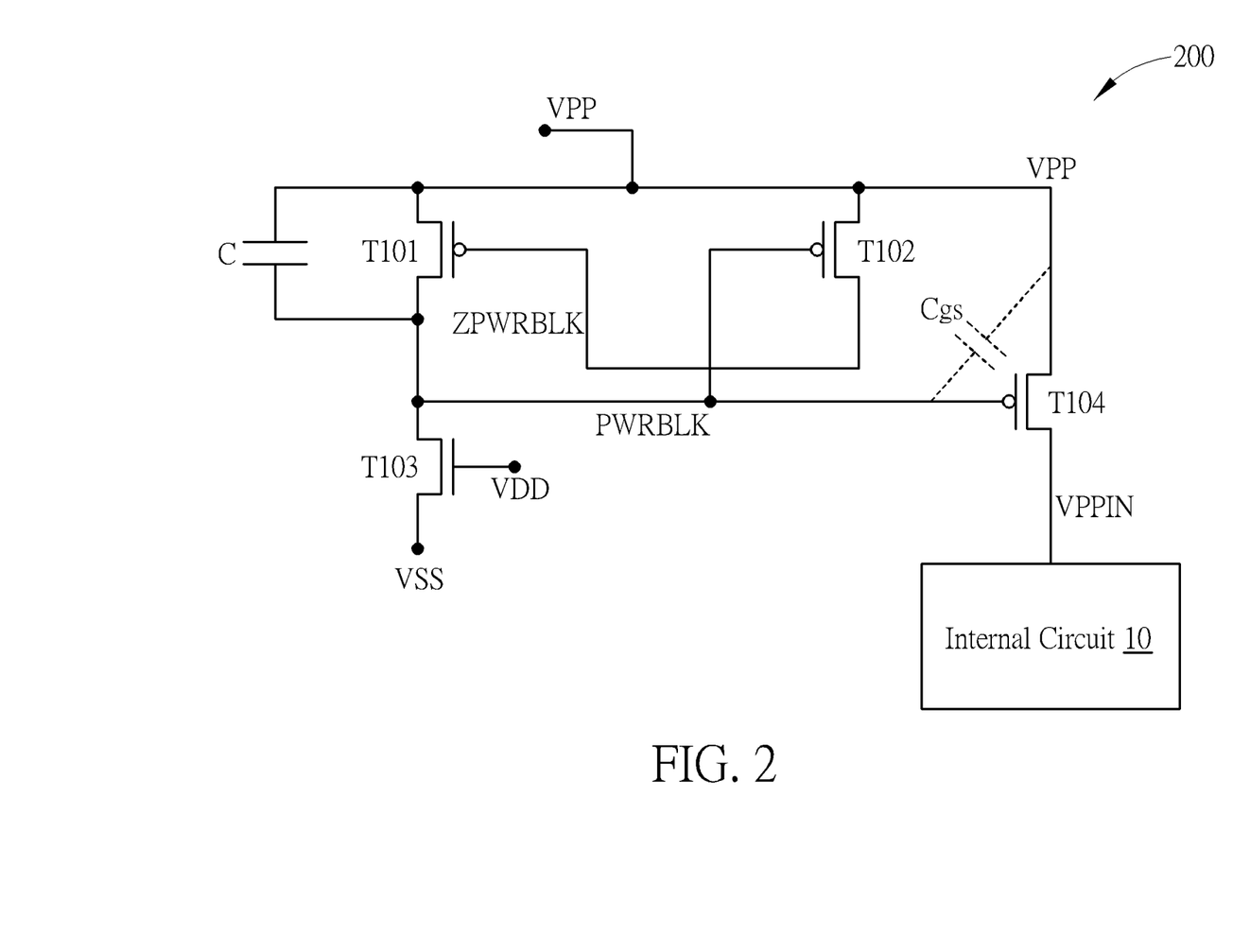
FIG. 2 illustrates a structure of a power-up sequence protection circuit according to a second embodiment of the present invention.

To improve performance (i.e., performance of response time) of the power-up sequence protection circuit 100, a capacitor can be introduced to the power-up sequence protection circuit 100. FIG. 2 illustrates a structure of a power-up sequence protection circuit 200 according to a second embodiment of the present invention. The power-up sequence protection circuit 200 is similar to the power-up sequence protection circuit 100. Layout structure of the first transistor T101, the second transistor T102, the third transistor T103, and the fourth transistor T104 in the power-up sequence protection circuit 100 and the power-up sequence protection circuit 200 are identical. Specifically, in the power-up sequence protection circuit 200, a capacitor C is disposed between the first terminal and the second terminal of the first transistor T101. The capacitor C includes a first terminal coupled to the first terminal of the first transistor T101, and a second terminal coupled to the second terminal of the first transistor T101. The capacitor C can be a metal-oxide-semiconductor (MOS) capacitor. Operations of the power-up sequence protection circuit 200 are similar to the operations of the power-up sequence protection circuit 100. In the power-up sequence protection circuit 200, when the program voltage VPP is unexpectedly powered up while the device voltage VDD is not powered up, the voltage PWRBLK is rapidly powered up by coupling the parasitic capacitor Cgs and the capacitor C. In other words, an equivalent capacitor for boosting the voltage PWRBLK is relevant to the parasitic capacitor Cgs and the capacitor C. Since the parasitic capacitor Cgs and the capacitor C can be jointly used for boosting the voltage PWRBLK, the coupling performance can be improved. As a result, the response time of the power-up sequence protection circuit 200 outperforms the power-up sequence protection circuit 100.

Figure 3:
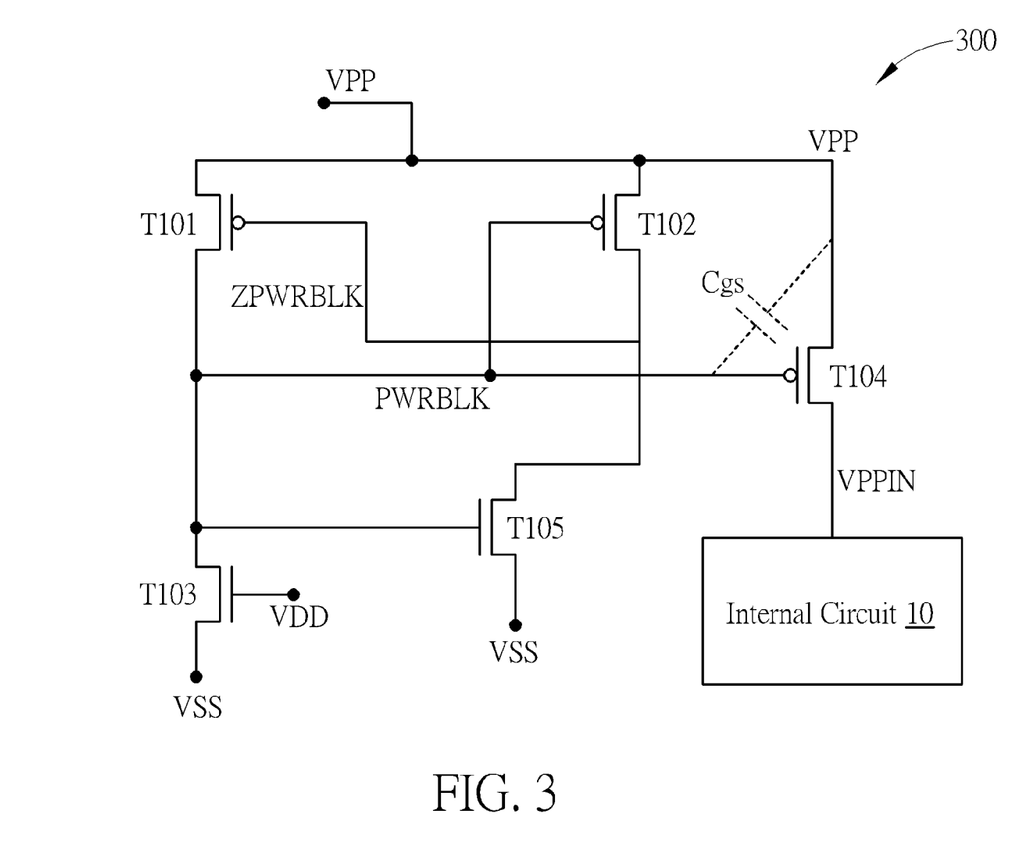
FIG. 3 illustrates a structure of a power-up sequence protection circuit according to a third embodiment of the present invention.

FIG. 3 illustrates a structure of a power-up sequence protection circuit 300 according to a third embodiment of the present invention. The power-up sequence protection circuit 300 is similar to the power-up sequence protection circuit 100. Layout structure of the first transistor T101, the second transistor T102, the third transistor T103, and the fourth transistor T104 in the power-up sequence protection circuit 100 and the power-up sequence protection circuit 300 are identical. Specifically, a fifth transistor T105 is introduced to the power-up sequence protection circuit 300. The fifth transistor T105 includes a first terminal coupled to the second terminal of the second transistor T102, a control terminal coupled to the second terminal of the first transistor T101, and a second terminal for receiving the ground voltage VSS. The fifth transistor T105 can be an N-type metal-oxide-semiconductor. Operations of the power-up sequence protection circuit 300 are illustrated below.

In an initial stage, the device voltage VDD is at a low voltage (i.e., a floating state or substantially equal to the ground voltage VSS). Thus, the third transistor T103 is turned off. The voltage ZPWRBLK and the voltage PWRBLK are initially at a low voltage. When the program voltage VPP is unexpectedly powered up while the device voltage VDD is not powered up (i.e., an abnormal condition), the voltage ZPWRBLK and the voltage PWRBLK are increased gradually through the first transistor T101 and the second transistor T102. When the voltage PWRBLK is increased to reach a threshold voltage of the fifth transistor T105, the fifth transistor T105 is turned on. Further, when the voltage PWRBLK is increased to satisfy VPP−PWRBLK<|Vthp|, the second transistor T102 is turned off. The voltage Vthp is denoted as a threshold voltage of the second transistor T102. Then, the voltage ZPWRBLK is decreased to the ground voltage VSS, which turns on the first transistor T101 completely. For example, when the voltage PWRBLK is increased to the program voltage VPP (for example, 7.5 volts), the voltage ZPWRBLK is decreased to the ground voltage VSS (around 0 volts). Since the voltage PWRBLK can be increased to the program voltage VPP, the fourth transistor T104 is turned off. As a result, the program voltage VPP can be blocked from entering to the second terminal of the fourth transistor T104 from the first terminal of the fourth transistor T104. Therefore, the second terminal of the fourth transistor T104 can avoid outputting the unexpected power-up program voltage VPP. Briefly, the power-up sequence protection circuit 300 uses an active method for solidly suppressing the voltage ZPWRBLK to the ground voltage VSS by using the fifth transistor T105 when the voltage PWRBLK is high enough (i.e., reaches to the threshold voltage of the fifth transistor T105). When the program voltage VPP is unexpectedly powered up while the device voltage VDD is not powered up, the first transistor T101 is turned on, the second transistor T102 is turned off, the fourth transistor T104 is turned off, and the fifth transistor T105 is turned on so as to avoid outputting the program voltage VPP to the internal circuit 10.

When the device voltage VDD is powered up either while the program voltage VPP is powered up or not, the third transistor T103 is turned on. Then, the voltage PWRBLK is decreased to substantially equal to the ground voltage VSS, which turns on the second transistor T102 and turns off the fifth transistor T105. Here, two cases are considered for illustrating operations of the power-up sequence protection circuit 300 while the device voltage VDD is powered up. In the first case, the device voltage VDD is powered up while the program voltage VPP is not powered up. The voltage PWRBLK is at the ground voltage VSS since the third transistor T103 is turned on. Since the voltage PWRBLK is at the ground voltage, the fourth transistor T104 is turned on to allow the program voltage VPP to pass through the fourth transistor T104. In the second case, the program voltage VPP is powered up while the device voltage VDD is already powered up. The voltage ZPWRBLK is increased to substantially equal to the program voltage VPP since the second transistor T102 is turned on. Thus, the first transistor T101 is completely turned off, and the voltage PWRBLK is fixed to the ground voltage VSS. Since the voltage PWRBLK is at around the ground voltage VSS, the fourth transistor T104 is turned on. As a result, the voltage VPPIN at the second terminal of the fourth transistor T104 is equal to the program voltage VPP (for example, 7.5 volts). In other words, when the device voltage VDD is powered up either while the program voltage VPP is powered up or not, the power-up sequence protection circuit 300 can be regarded as a bypass circuit since the program voltage VPP is directly outputted to the internal circuit 10 through the fourth transistor T104.

Figure 4:
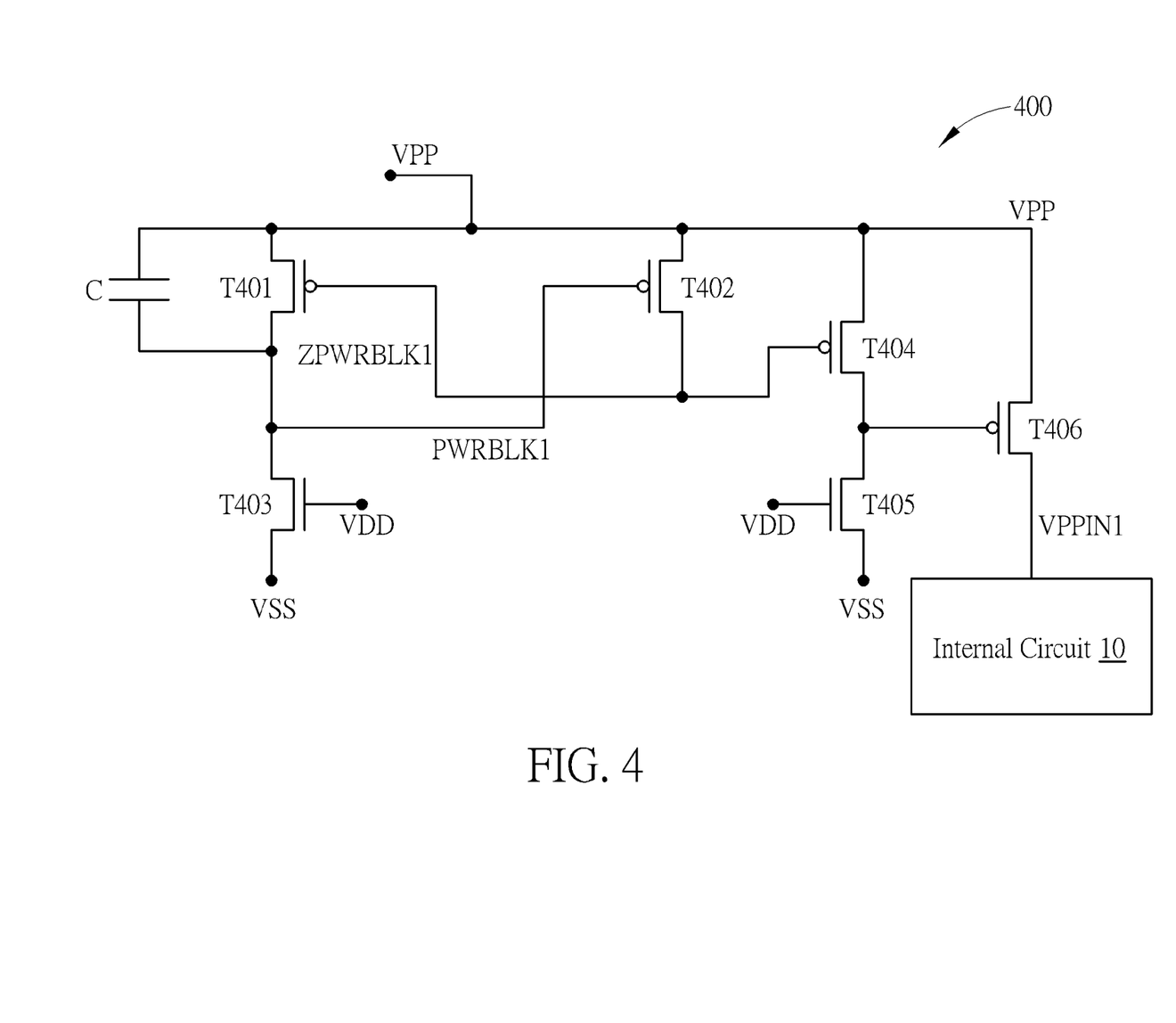
FIG. 4 illustrates a structure of a power-up sequence protection circuit according to a fourth embodiment of the present invention.

FIG. 4 illustrates a structure of a power-up sequence protection circuit 400 according to a fourth embodiment of the present invention. The power-up sequence protection circuit 400 includes a first transistor T401, a capacitor C, a second transistor T402, a third transistor T403, a fourth transistor T404, a fifth transistor T405, and a sixth transistor T406. The first transistor T401 includes a first terminal for receiving a program voltage VPP, a control terminal, and a second terminal. The capacitor C includes a first terminal coupled to the first terminal of the first transistor T401, and a second terminal coupled to the second terminal of the first transistor T401. The second transistor T402 includes a first terminal coupled to the first terminal of the first transistor T401, a control terminal coupled to the second terminal of the first transistor T401, and a second terminal coupled to the control terminal of the first transistor T401. The third transistor T403 includes a first terminal coupled to the second terminal of the first transistor T401, a control terminal for receiving a device voltage VDD, and a second terminal for receiving a ground voltage VSS. The fourth transistor T404 includes a first terminal coupled to the first terminal of the first transistor T401, a control terminal coupled to the second terminal of the second transistor T402, and second terminal. The fifth transistor T405 includes a first terminal coupled to the second terminal of the fourth transistor T404, a control terminal for receiving a device voltage VDD, and a second terminal for receiving the ground voltage VSS. The sixth transistor T406 includes a first terminal coupled to the first terminal of the first transistor T401, a control terminal coupled to the first terminal of the fifth transistor T405, and a second terminal for outputting the program voltage VPP when the sixth transistor T406 is turned on. In the power-up sequence protection circuit 400, a voltage of the control terminal of the second transistor T402 is denoted as PWRBLK1 (hereafter, say "voltage PWRBLK1"). A voltage of the second terminal of the second transistor T402 is denoted as ZPWRBLK1 (hereafter, say "voltage ZPWRBLK1"). For avoiding ambiguity, a voltage of the second terminal of the sixth transistor T406 is denoted as VPPIN1 (hereafter, say voltage VPPIN1). In other words, when the sixth transistor T406 is turned on, the voltage VPPIN1 is equal to the program voltage VPP. When the sixth transistor T406 is turned off, the voltage VPPIN1 may be a low voltage or under a floating state. Also, the second terminal of the sixth transistor T406 is coupled to an internal circuit 10. Thus, the internal circuit 10 can receive the voltage VPPIN1 from the second terminal of the sixth transistor T406. Specifically, in the power-up sequence protection circuit 400, the first transistor T401, the second transistor T402, the fourth transistor T404, and the sixth transistor T406 can be P-type metal-oxide-semiconductors. The third transistor T403 and the fifth transistor T405 can be N-type metal-oxide-semiconductors. Similarly, the power-up sequence protection circuit 400 can perform circuit protection when the program voltage VPP is unexpectedly powered up while the device voltage VDD is not powered up. The power-up sequence protection circuit 400 can be regarded as a bypass circuit when the device voltage VDD is powered up. Operations of the power-up sequence protection circuit 400 are illustrated below.

In an initial stage, the device voltage VDD is at a low voltage (i.e., a floating state or substantially equal to the ground voltage VSS). Thus, the third transistor T403 and the fifth transistor T405 are turned off. The voltage ZPWRBLK1 and the voltage PWRBLK1 are initially at a low voltage. When the program voltage VPP is unexpectedly powered up while the device voltage VDD is not powered up (i.e., an abnormal condition), the voltage ZPWRBLK1 and the voltage PWRBLK1 are increased through the first transistor T401 and the second transistor T402. Specifically, since the capacitor C can be charged and thus regarded as a coupling conductive component, the voltage PWRBLK1 increases faster than the voltage ZPWRBLK1. In the power-up sequence protection circuit 400, when the voltage PWRBLK1 is increased to satisfy VPP−PWRBLK1<|Vthp|, the second transistor T402 is turned off. The voltage Vthp is denoted as a threshold voltage of the second transistor T402. Then, the voltage ZPWRBLK1 is fixed at a steady voltage lower than the voltage PWRBLK1, which keeps the first transistor T401 turned on. For example, when the voltage PWRBLK1 is increased to the program voltage VPP (for example, 7.5 volts), the voltage ZPWRBLK1 is then fixed to the steady voltage substantially equal to half of the program voltage (for example, 3.42~3.75 volts). Since the voltage ZPWRBLK1 is not high enough, the fourth transistor T404 is turned on. Since the device voltage VDD is at the low voltage, the fifth transistor T405 is turned off. As a result, a voltage at the second terminal of the fourth transistor T404 is equal to the program voltage VPP. Thus, the sixth transistor T406 is turned off. The program voltage VPP can be blocked from the entering to the second terminal of the sixth transistor T406 from the first terminal of the sixth transistor T406. Therefore, the second terminal of the sixth transistor T406 can avoid outputting the unexpected power-up program voltage VPP to the internal circuit 10. Thus, for an internal circuit coupled to the power-up sequence protection circuit 400, a risk of circuit disturbance or power leakage can be reduced. Briefly, when the program voltage VPP is unexpectedly powered up before the device voltage VDD is powered up, the first transistor T401 is turned on, the second transistor T402 is turned off, the fourth transistor T404 is turned on, and the sixth transistor T406 is turned off so as to avoid outputting the program voltage VPP to the internal circuit 10.

When the device voltage VDD is powered up either while the program voltage VPP is powered up or not, the third transistor T403 is turned on. Then, the voltage PWRBLK1 is decreased to substantially equal to the ground voltage VSS, which turns on the second transistor T402. Here, two cases are considered for illustrating operations of the power-up sequence protection circuit 400 while the device voltage VDD is powered up. In the first case, the device voltage VDD is powered up while the program voltage VPP is not powered up. The voltage PWRBLK1 is at the ground voltage VSS since the third transistor T403 is turned on. Since the voltage PWRBLK1 is at the ground voltage, the second transistor T402 is turned on. The voltage ZPWRBLK1 is not powered up, which keeps the fourth transistor T404 turned on. Since the program voltage VPP is not powered up (i.e., a floating state or substantially equal to the ground voltage VSS), the sixth transistor T406 is turned on, allowing the program voltage VPP to pass through the fourth transistor T104. In the second case, the program voltage VPP is powered up while the device voltage VDD is already powered up. The voltage PWRBLK1 is decreased to substantially equal to the ground voltage VSS. Then, the second transistor T402 is turned on. The voltage ZPWRBLK1 is then increased to substantially equal to the program voltage VPP. Since the voltage ZPWRBLK1 is powered up to the program voltage VPP, the first transistor T401 is turned off, which keeps the voltage PWRBLK1 fixed at the ground voltage VSS. Since the voltage ZPWRBLK1 is at around the program voltage VPP, the fourth transistor T404 is turned off. A voltage at the first terminal of the fifth transistor T405 is at the ground voltage VSS since the fifth transistor T405 is turned on. Then, the sixth transistor T406 is turned on. As a result, the voltage VPPIN1 at the second terminal of the sixth transistor T406 is equal to the program voltage VPP (for example, 7.5 volts). In other words, when the device voltage VDD is powered up either while the program voltage VPP is powered up or not, the power-up sequence protection circuit 400 can be regarded as a bypass circuit since the program voltage VPP is directly outputted to the internal circuit 10 through the sixth transistor T406.

Figure 5:
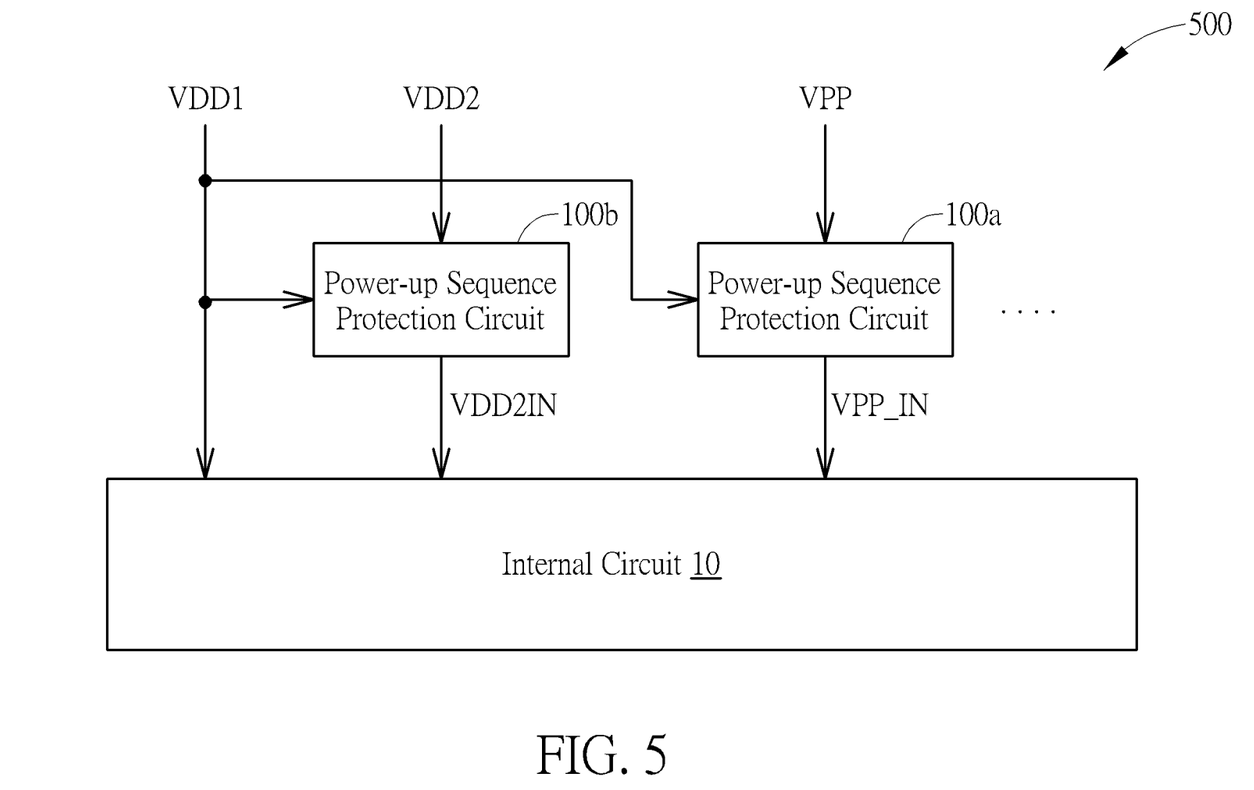
FIG. 5 illustrates a power-up sequence system including at least one power-up sequence protection circuit illustrated in FIG. 1 to FIG. 4.

FIG. 5 illustrates a power-up sequence system 500 including at least one power-up sequence protection circuit selected from the embodiments in FIG. 1 to FIG. 4. In FIG. 5, the power-up sequence system 500 with two pair-wised voltage stages includes an internal circuit 10, a power-up sequence protection circuit 100a and a power-up sequence protection circuit 100b. A device voltage VDD1 is inputted to the internal circuit 10 for controlling a core circuit of the internal circuit. An input/output (I/O) voltage VDD2 is inputted to the internal circuit 10 through the power-up sequence protection circuit 100b for controlling input/output devices of the internal circuit. A program voltage VPP is inputted to the internal circuit 10 through the power-up sequence protection circuit 100a for controlling an access operation of the internal circuit 10. Specifically, one of the power-up sequence protection circuits 100 to 400 can be applied to the power-up sequence protection circuit 100a or the power-up sequence protection circuit 100b. For example, a first terminal of the first transistor T101 or T401 can be used for receiving the I/O voltage VDD2. A control terminal of the third transistor T103 or T403 can be used for receiving the device voltage VDD1. By doing so, the power-up sequence protection circuit 100b can be realized by using one circuit structure selected from the power-up sequence protection circuits 100 to 400. When the I/O voltage VDD2 is unexpectedly powered up while the device voltage VDD1 is not powered up, the power-up sequence protection circuit 100b can avoid outputting the I/O voltage VDD2 to the internal circuit 10. Thus, a voltage VDD2IN inputted to the internal circuit 10 is not powered up while the device voltage VDD1 is not powered up. Similarly, the first terminal of the first transistor T101 or T401 can be used for receiving the program voltage VPP. The control terminal of the third transistor T103 or T403 can be used for receiving the device voltage VDD1. By doing so, the power-up sequence protection circuit 100a can be realized by using one circuit structure selected from the power-up sequence protection circuits 100 to 400. When the program voltage VPP is unexpectedly powered up while the device voltage VDD1 is not powered up, the power-up sequence protection circuit 100a can avoid the program voltage VPP outputting to the internal circuit 10. Thus, a voltage VPP_IN inputted to the internal circuit 10 is not powered up while the device voltage VDD1 is not powered up. However, any reasonable hardware modification of the power-up sequence system 500 falls into the scope of the present invention. For example, the power-up sequence system 500 can introduce more than two pair-wised stages in conjunction with corresponding power-up sequence protection circuits.

To sum up, the present invention discloses several embodiments of power-up sequence protection circuits. The power-up sequence protection circuits can be applied to a power-up sequence system with multi-stages voltage control mechanism. The power-up sequence protection circuits can perform circuit protection when any unexpected voltage is powered up while the device voltage VDD is not powered up. The power-up sequence protection circuits can be regarded as bypass circuits when the device voltage VDD is powered up. Further, the power-up sequence protection circuits can perform automatic circuit protection without requiring additional control pins. By using the power-up sequence protection circuits, a risk of circuit disturbance or power leakage can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-up sequence protection circuit comprising:
 a first transistor comprising:
  a first terminal configured to receive a program voltage;
  a control terminal; and
  a second terminal;
 a second transistor comprising:
  a first terminal coupled to the first terminal of the first transistor;
  a control terminal coupled to the second terminal of the first transistor; and
  a second terminal coupled to the control terminal of the first transistor, wherein a signal outputted from the second terminal of the second transistor is only received by the control terminal of the first transistor;
 a third transistor comprising:
  a first terminal coupled to the second terminal of the first transistor;
  a control terminal configured to receive a device voltage; and
  a second terminal configured to receive a ground voltage; and
 a fourth transistor comprising:
  a first terminal coupled to the first terminal of the second transistor;
  a control terminal coupled to the second terminal of the first transistor; and
  a second terminal configured to output the program voltage when the fourth transistor is turned on;
 wherein when the program voltage is unexpectedly powered up while the device voltage is not powered up, the first transistor is turned on, the second transistor is turned off, and the fourth transistor is turned off so as to avoid outputting the program voltage from the second terminal of the fourth transistor; and
 wherein when the fourth transistor is turned off, the second terminal of the fourth transistor is operated under a floating state.

2. The power-up sequence protection circuit of claim 1, wherein the first transistor, the second transistor, and the fourth transistor are P-type metal-oxide-semiconductors.

3. The power-up sequence protection circuit of claim 1, wherein the third transistor is an N-type metal-oxide-semiconductor.

4. The power-up sequence protection circuit of claim 1, wherein a voltage of the control terminal of the fourth transistor is equal to the program voltage, and a voltage of the control terminal of the first transistor is equal to half of the program voltage.

5. The power-up sequence protection circuit of claim 1, wherein a parasitic capacitor is generated between the first terminal and the control terminal of the fourth transistor so that the voltage of the control terminal of the fourth transistor increases faster than the voltage of the control terminal of the first transistor when the program voltage is unexpectedly power-up while the device voltage is not ready.

6. The power-up sequence protection circuit of claim 1, further comprising:
 a capacitor comprising:
  a first terminal coupled to the first terminal of the first transistor; and
  a second terminal coupled to the second terminal of the first transistor.

7. The power-up sequence protection circuit of claim 6, wherein the capacitor is a metal-oxide-semiconductor (MOS) capacitor.

8. The power-up sequence protection circuit of claim 6, wherein when the program voltage is unexpectedly powered up before the device voltage is powered up, the first transistor is turned on, the second transistor is turned off, and the fourth transistor is turned off so as to block the program voltage outputted from the second terminal of the fourth transistor.

9. The power-up sequence protection circuit of claim 8, wherein a voltage of the control terminal of the fourth transistor is equal to the program voltage, and a voltage of the control terminal of the first transistor is equal to half of the program voltage.

10. The power-up sequence protection circuit of claim 9, wherein a parasitic capacitor is generated between the first terminal and the control terminal of the fourth transistor so that the voltage of the control terminal of the fourth transistor increases faster than the voltage of the control terminal of the first transistor when the program voltage is unexpectedly power-up while the device voltage is not ready.

11. The power-up sequence protection circuit of claim 1, further comprising:
 a fifth transistor comprising:
  a first terminal coupled to the second terminal of the second transistor;
  a control terminal coupled to the second terminal of the first transistor; and
  a second terminal configured to receive the ground voltage.

12. The power-up sequence protection circuit of claim 11, wherein the fifth transistor is an N-type metal-oxide-semiconductor.

13. The power-up sequence protection circuit of claim 11, wherein when the program voltage is unexpectedly powered up before the device voltage is powered up, the first transistor is turned on, the second transistor is turned off, the fourth transistor is turned off, and the fifth transistor is turned on so as to block the program voltage outputted from the second terminal of the fourth transistor.

14. The power-up sequence protection circuit of claim 13, wherein a voltage of the control terminal of the fourth transistor is equal to the program voltage, and a voltage of the control terminal of the first transistor is equal to the ground voltage.

15. The power-up sequence protection circuit of claim 14, wherein a parasitic capacitor is generated between the first terminal and the control terminal of the fourth transistor so that the voltage of the control terminal of the fourth transistor increases faster than the voltage of the control terminal of the first transistor when the program voltage is unexpectedly power-up while the device voltage is not ready.

* * * * *